(12) United States Patent
Hayakawa et al.

(10) Patent No.: US 8,133,413 B2
(45) Date of Patent: Mar. 13, 2012

(54) RESISTOR COMPOSITIONS USING A CU-CONTAINING GLASS FRIT

(75) Inventors: Keiichiro Hayakawa, Tokyo (JP); Jerome David Smith, Cary, NC (US); Yuko Ogata, Tochigi (JP); Marc H. Labranche, Chapel Hill, NC (US); Kenneth Warren Hang, Hillsborough, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 55 days.

(21) Appl. No.: 12/425,742

(22) Filed: Apr. 17, 2009

(65) Prior Publication Data

US 2009/0261307 A1   Oct. 22, 2009

Related U.S. Application Data

(60) Provisional application No. 61/046,268, filed on Apr. 18, 2008.

(51) Int. Cl.
*H01B 1/22* (2006.01)
(52) U.S. Cl. ................. 252/518.1; 252/519.13
(58) Field of Classification Search ............... 252/518.1, 252/519.13
See application file for complete search history.

(56) References Cited

U.S. PATENT DOCUMENTS

| 3,583,931 | A | | 6/1971 | Bouchard |
| 4,362,656 | A | | 12/1982 | Hormadaly |
| 5,474,711 | A | * | 12/1995 | Borland et al. ............ 252/518.1 |
| 5,491,118 | A | * | 2/1996 | Hormadaly ................... 501/20 |
| 5,534,194 | A | | 7/1996 | Borland et al. |
| 7,282,163 | B2 | * | 10/2007 | Tanaka et al. ............. 252/518.1 |
| 2005/0062585 | A1 | * | 3/2005 | Tanaka et al. ................ 338/308 |
| 2006/0186382 | A1 | * | 8/2006 | Igarashi et al. ............... 252/500 |

FOREIGN PATENT DOCUMENTS

| EP | 0 132 810 A1 | 2/1985 |
| EP | 0 548 865 A2 | 6/1993 |
| EP | 0 628 974 A2 | 12/1994 |
| JP | 11-003801 A | 1/1999 |
| JP | 2001185409 A | 7/2001 |
| JP | 2005244115 A | 9/2009 |
| WO | 93/23855 A1 | 11/1993 |
| WO | 99/63553 A1 | 12/1999 |

OTHER PUBLICATIONS

PCT International Search Report, Jul. 22, 2009.

* cited by examiner

*Primary Examiner* — Mark Kopec

(57) ABSTRACT

This invention relates to a composition using a ruthenium oxide and/or a polynary ruthenium oxide as conducting components and using a Cu containing glass frit.

14 Claims, No Drawings

RESISTOR COMPOSITIONS USING A CU-CONTAINING GLASS FRIT

FIELD OF THE INVENTION

This invention relates to a composition useful for producing a thick film resistor, and specifically to a composition using a ruthenium oxide and/or a polynary ruthenium oxide as conducting components.

TECHNICAL BACKGROUND OF THE INVENTION

Thick film resistor compositions widely used in thick film resistor electrical parts, thick film hybrid circuits, etc. are compositions for preparing a resistor thick film by printing the composition on a conductor pattern or electrodes formed on the surface of an insulating substrate, followed by firing the print at temperatures near 850° C.

The thick film resistor compositions are prepared by dispersing a conducting component and an inorganic binder in an organic medium (vehicle). The conducting component plays a role in determining the electrical properties of the thick film resistor, and a ruthenium oxide may be used as this component. The inorganic binder comprises glass, and has a function of retaining the thick film integrally and binding it to the substrate. The organic medium is a dispersing medium that affects the application properties, particularly rheology, of the composition.

Recent increases in the price of ruthenium have made lower ruthenium compositions desirable. One approach is to reduce the amount of ruthenium that is necessary in a composition by using higher surface area ruthenium oxides, but this results in temperature coefficients of resistance (TCR) becoming more negative. At times, the TCR exceeds the permissible range, especially in the sheet resistivity range of 10 Kohm-1 Megohm. It is desirable for a thick film resistor composition to have a low ruthenium content while maintaining positive TCR.

SUMMARY OF THE INVENTION

The invention provides a thick film resistor composition containing 0-8 wt. % of divided solids of a ruthenium oxide having an average specific surface area of greater than 15 m$^2$/g, or in other embodiments 20-30 m$^2$/g and 5-25% of a ruthenium pyrochlore oxide as conducting component and 20-60 wt % of a mixture of glasses as an inorganic binder.

The invention provides a thick-film resistor paste composition including a resistor composition dispersed in an organic vehicle, said resistor composition comprising: (a) a conductive composition comprising ruthenium oxide and ruthenium pyrochlore oxide; and (b) at least a first and a second glass frit, wherein said first glass frit comprises copper. The ruthenium pyrochlore oxide may or may not be included in embodiments of the invention. The thick-film resistor paste composition may have ruthenium oxide with an average specific surface area of greater than about 15 m$^2$/g. In embodiments of the invention, the A thick-film resistor paste composition has a ruthenium pyrochlore oxide which is lead ruthenium pyrochlore oxide.

The invention provides a first glass frit comprising from about 2 wt % to about 8 wt % CuO, based upon the weight of the first glass frit. In other embodiments, the first glass frit comprises: (i) 5-15 wt % B2O3, (ii) 40-55 wt % SiO2, (iii) 15-35 wt % of an oxide selected from the group consisting of BaO, CaO, ZnO, SrO, and combinations thereof; and wherein (iv) said copper is 2-8 wt % CuO, (v) Ta2O5 is 2-8 wt % and (vi) an oxide selected from the group consisting of Na2O, K2O, Li2O and combinations thereof is 1-8 wt %, and optionally including any of (vii) ZrO2 0-6 wt % and (viii) 0-8 wt % Al2O3, based upon the weight of said first glass frit. In the present invention the first glass frit comprises from about 8 wt % to about 20 wt % of said thick-film resistor paste composition, based upon the weight of said thick-film resistor paste composition.

In other embodiments of the invention, the thick-film resistor paste composition according to the invention has a first glass frit (copper containing) which comprises: (i) 5-36 wt % B$_2$O$_3$, (ii) 23-54 wt % SiO$_2$, (iii) an oxide selected from the group consisting of 6-54 wt % BaO, CaO, 2-13 wt % ZnO, 0.5-5.0 wt % SrO, and combinations thereof; and wherein (iv) said copper is 1-9 wt % CuO, (v) Ta$_2$O$_5$ is 0.3-7 wt % and (vi) an oxide selected from the group consisting of 0.5-6.0 wt % Na$_2$O, 0.3-8.0 wt % K$_2$O, Li$_2$O and combinations thereof, and (vi) 2-7 wt % Al$_2$O$_3$, based upon the weight of said first glass frit.

The thick film resistor composition of the present invention may contain, as the conducting component, ruthenium pyrochlore oxides in addition to ruthenium oxide. The ruthenium pyrochlore oxides are kinds of pyrochlore oxides which are multi-component compounds of Ru$^{4+}$, Ir$^{4+}$ or a mixture of these expressed by the following general formula:

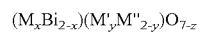

$$(M_xBi_{2-x})(M'_yM''_{2-y})O_{7-z}$$

wherein
M is selected from the group consisting of yttrium, thallium, indium, cadmium, lead, copper and rare earth metals,
M' is selected from the group consisting of platinum, titanium, chromium, rhodium and antimony,
M" is ruthenium, iridium or a mixture of these,
x denotes 0 to 2 with the proviso that x is less than or equal to 1 for monovalent copper
y denotes 0 to 0.5 with the proviso that when M' is rhodium or two or more of platinum, titanium, chromium, rhodium and antimony, y stands for 0 to 1, and
z denotes 0 to 1 with the proviso that when M is divalent lead or cadmium, z is at least equal to about x/2.

Commonly assigned, expired U.S. Pat. No. 3,583,931 to Bouchard discloses electrically conductive, bismuth ruthenium oxides, bismuth iridium oxides, substituted such bismuth-containing oxides, all of pyrochlore-related crystal structure.

The preferred ruthenium pyrochlore oxide is lead ruthenate (Pb$_2$Ru$_2$O$_6$). This compound is obtained easily in pure form, is not adversely affected by the glass binder, has a relatively small TCR, is stable even when heated to about 1000° C. in air, and are relatively stable even in a reducing atmosphere. Other pyrochlores, Bi$_2$Ru$_2$O$_7$, Pb$_{1.5}$Bi$_{0.5}$Ru$_2$O$_{6.20}$ and CdBiRu$_2$O$_{6.5}$ may also be used. In the above-referenced compound, y=0 for all the pyrochlore compounds in accordance with the invention.

In the present invention, the ruthenium pyrochlore oxide may be finely divided, however, there are no restrictions regarding its specific surface area.

A mixture of glasses may be used in the binder which sinters the conductive powder together. Table I includes the composition of the glasses used in the resistors of this invention. The resistor compositions may include 5-12% of a frit listed as Glass A, 8-25% of Glass B, 12-25% of Glass C, and 8-20% of Glass D. In the invention, Glass D provides for more positive TCRs in the resistor compositions described in this invention.

TABLE I

|  | Glass A | Glass B | Glass C | Glass D | Glass E |
| --- | --- | --- | --- | --- | --- |
| $Al_2O_3$ | 14.00 | 3.15 | 1.90 | 2.84 | 2.59 |
| $B_2O_3$ | 7.50 | 3.08 |  | 5.82 | 2.96 |
| BaO |  |  |  | 7.32 |  |
| CaO | 21.50 |  |  |  |  |
| CuO |  | 2.76 |  | 5.70 |  |
| FeO | 0.25 |  |  |  |  |
| $K_2O$ | 0.25 |  |  |  |  |
| $K_2O$ |  |  |  | 1.50 |  |
| MgO | 1.00 |  |  |  |  |
| $Na_2O$ | 0.25 |  |  | 4.93 |  |
| PbO |  | 58.90 | 65.00 |  | 62.5841 |
| $SiO_2$ | 55.00 | 29.52 | 33.10 | 51.65 | 29.13 |
| SrO |  |  |  | 3.30 |  |
| $Ta_2O_5$ |  |  |  | 5.28 |  |
| $TiO_2$ | 0.25 |  |  |  |  |
| ZnO |  | 2.59 |  | 11.66 | 2.74 |

The resistor composition may additionally include 0-1% Ag oxide powder, 0-10% zirconium silicate powder, and 0-3% niobium pentoxide powder.

The above inorganic solids of the present invention are dispersed in the organic medium or vehicle to make a printable composition paste.

The inorganic solids above are dispersed into an organic vehicle to allow screen printing the composition on a substrate. Any inert liquids can be used as the vehicle. There may be used water or one of various organic liquids, the water or each liquid containing or not containing thickening agents and/or stabilizers and/or other ordinary additives. Examples of the organic liquids usable are aliphatic alcohols, esters (e.g., acetates and propionates) of such alcohols, terpenes such as pine root oil or terpineol, and solutions of resins (e.g., polymethacrylates of lower alcohols or ethyl cellulose) in solvents (e.g., pine root oil and monobutyl ether of ethylene glycol monoacetate). In the vehicle may also be incorporated volatile liquids for promoting rapid solidification after application to the substrate. Alternatively, the vehicle may be composed of such volatile liquids. In embodiments of the invention the vehicle is based on ethyl cellulose and beta-terpineol.

DETAILED DESCRIPTION OF THE INVENTION

The present inventors have surprisingly found that a Cu-containing glass is very useful in maintaining positive temperature coefficients of resistance (TCR). This enables the TCRs to be maintained in a desirable range when, in accordance with the invention, the surface area of the ruthenium oxide conductive is increased to reduce the amount of ruthenium required in a resistor composition.

The ruthenium pyrochlore oxide may be used in a proportion of 0-20 wt %, or 0-15 wt %, based on the total weight of the composition containing the organic medium. If the amount of ruthenium pyrochlore oxide is based on the total content of the inorganic solids, this proportion may be 0-30 wt %, or 0-25 wt %.

The inorganic binder in the thick film resistor composition of the present invention may be chosen from various glasses that are suitable for use in thick film resistor compositions. They include lead silicate glasses and lead borosilicate glasses.

Examples of the formulations for glasses that can be used as the inorganic binder in the present invention are shown in Table 1. The examples of glasses listed in these tables can be produced by an ordinary manufacturing method. As is well known in the art, the heating is performed to the peak temperature until the melt will become completely liquid and no gases will be generated. In the present invention, the peak temperature is in the range of from 1100° C. to 1500° C., usually from 1200° C. to 1400° C. Then, the melt is typically poured onto a cold belt or in cold running water for quenching. Then, the product is milled, if desired, to reduce its particle size.

More specifically, these glasses can be produced by melting for 20 minutes to 1 hour at about 1200° C.-1400° C. disposed in a platinum crucible in an electrically heated silicon carbide furnace. By treatment with a rotary or oscillation mill, the final average particle size can be adjusted to 0.7 to 2 microns. The oscillation mill treatment is carried out by placing an inorganic powder and alumina cylinder together with an aqueous medium in the container, and then oscillating the container for a specified period of time.

In the thick film resistor composition of the present invention, the above-listed glasses can be used as the inorganic binder. The glasses are used in combination to achieve a good balance of properties, including the sensitivity of resistance and TCR to the firing profile, the reduction of the length effect of the resistor TCR and the reduction or changes in resistance and TCR due to the firing of the overcoat glass.

The thick film resistor composition of the present invention may further contain an inorganic additive such as $Nb_2O_5$. $Nb_2O_5$ contributes to the conductivity of the thick film resistor. The inorganic additive is used in a proportion of 0-3 wt. % based of the total weight of the compositions containing the organic medium These inorganic solids of the present invention are dispersed in the organic medium (vehicle) to make a printable composition paste. In the present invention the organic medium is used in a proportion of 20-60 wt %, or 35-45 wt %, based on the total weight of the composition.

Any inert liquids can be used as vehicles. There may be used as the vehicle one of water and various organic liquids each containing or not containing thickening agents and/or stabilizers and/or other ordinary additives. Examples of the organic liquids usable are aliphatic alcohols, esters (e.g., acetates and propionates) of such alcohols, terpenes such as pine root oil or terpineol, and solutions of resins (e.g., polymethacrylates of lower alcohols or ethyl cellulose). In solvents (e.g., pine root oil and monobutyl ether of ethylene glycol monoacetate). In the vehicle may be contained volatile liquids for promoting rapid solidification after application to the substrate. Alternatively, the vehicle may be composed of such volatile liquids. The preferred vehicle is based on ethyl cellulose and beta-terpineol.

The thick film resistor composition of the present invention can be prepared employing a roll mill to incorporate and disperse the inorganic powders into the organic vehicle.

The resistor composition of the present invention can be printed as a film on a ceramic, alumina or other dielectric substrate by an ordinary method. Advantageously an alumina substrate is used, and the resistor composition is printed on a pre-fired palladium-silver termination.

Generally, a screen stencil technique can be used preferably. The resulting printed pattern is generally allowed to stand for leveling, and dried for about 10 minutes at an elevated temperature of approximately 150° C. Then, it is fired at a peak temperature of about 850° C. in a belt furnace in air.

The following is a description of the testing methods for the various characteristics of the thick film resistor composition.

(1) Method of Preparing a Thick Film Resistor Composition Paste

The vehicle is added to predetermined amounts of the inorganic solids, and the mixture is kneaded by a roll mill to make a paste.

(2) Printing and Firing

A Pd/Ag thick film conductor is printed on a 1 inch×1 inch (25 mm×25 mm) 96% alumina substrate to a dry film thickness of 15+/−2 mu m, and is then dried for 10 minutes at 150 DEG C.

Then, the thick film resistor composition paste is printed to a size of 0.8 mm×0.8 mm or 0.5 mm×0.5 mm. The thickness of the coating is such that the resulting dry film thickness will be 15+/−5 microns. The print is dried at 150° C. for 10 minutes, and then fired in a belt furnace. The temperature profile of the belt furnace is such that the peak temperature of about 850° C. is maintained for 10 minutes, followed by cooling. The firing time is such that the period from the time when the temperature during heating has exceeded 100° C. until the time when the temperature during cooling has become lower than 100° C. is 30 minutes.

(3) Measurement of Resistance

The resistance is measured with a terminal-patterned probe using an autorange autobalance digital ohmmeter with a precision of 0.01%. Specifically, samples are laid on the terminal post in the chamber, and electrically connected with the digital ohmmeter. The temperature in the chamber is adjusted to 25° C. and equilibrated. Then, each sample is measured for resistance, and the readings are recorded.

Then, the temperature in the chamber is raised to 125° C. and equilibrates. Then, each sample is measured again for resistance, and the readings are recorded.

TCR is calculated from the following equation:

$$TCR = ((R_{125°C} - R_{25°C})/R_{25°C}) \times 10000 \text{ ppm/°C.}$$

EXAMPLES

The thick film resistor compositions of Examples 1 to 5 were produced in the manner described below. Examples 3 and 5 represent the compositions of the present invention.

|  | Example 1 | Example 2 | Example 3 | Example 4 | Example 5 |
|---|---|---|---|---|---|
| ruthenium oxide | 3.00 | 3.00 | 3.00 | 10.80 | 10.80 |
| Glass C | 12.08 | 16.02 | 13.65 | 15.65 | 15.65 |
| Glass A | 9.26 | 11.22 | 8.90 | 10.21 | 10.21 |
| Glass B | 22.21 | 16.02 | 9.66 | 16.16 | 11.08 |
| Niobium oxide |  | 0.30 |  | 0.93 | 0.93 |
| Ag oxide | 0.24 | 0.24 | 0.24 | 0.24 | 0.24 |
| Glass E |  |  |  | 6.00 |  |
| Glass D |  |  | 11.35 |  | 11.08 |
| Lead ruthenium pyrochlore | 13.20 | 13.20 | 13.20 |  |  |
| Organic Vehicle | 40 | 40 | 40 | 40 | 40 |
| Sum | 100.0 | 100.0 | 100.0 | 100.0 | 100.0 |
| Sheet Resistivity ohm/sq | 7.26E+04 | 6.06E+04 | 5.40E+04 | 1.87E+03 | 1.70E+03 |
| TCR ppm/C. | −107 | −98 | −57 | −40 | 65 |

The compositions of Examples 1 through 2 each contain 3 wt. % of a ruthenium oxide and 13.2% lead ruthenium pyrochlore as conducting components, 9-12 wt. % of glass A and 16-23 wt. % of glass B as inorganic binders, 12-16 wt. % of Glass C, 0-0.3% wt. % niobium oxide, and 0.24 wt. % silver oxide as an inorganic additive, and 40 wt. % of an organic medium. The sheet resistivity and TCRs of these compositions on 0.8 mm×0.8 mm resistors was measured at 72.6 Kohm/−107 ppm/C and 60.5 Kohm/−98 ppm/C, respectively. In Example 3, Glass D has been substituted largely for Glass B, and in smaller portions Glasses A and C. While the sheet resistivity at 54 Kohm/sq is nearly the same as Examples 1 and 2, the positive effect on TCR can be seen in the result of −57 ppm/C (vs −107, 98 ppm/C).

In Example 4 and 5 a similar comparison is shown, where a substitute of Glass B and E in Example is made with Glass D in Example 5. The sheet resistivities are nearly identical, but the TCRs in Example 5 are more positive corresponding to the inclusion of Glass D.

What is claimed is:

1. A thick-film resistor paste composition including a resistor composition dispersed in an organic vehicle, said resistor composition comprising:
    (a) a conductive composition comprising ruthenium oxide and ruthenium pyrochlore oxide; and
    (b) at least a first and a second glass frit, wherein said first glass frit comprises copper, wherein said first glass frit comprises: (i) 5-15 wt % $B_2O_3$, (ii) 40-55 wt % $SiO_2$, (iii) 15-35 wt % of an oxide selected from the group consisting of BaO, CaO, ZnO, SrO, and combinations thereof; and wherein (iv) said copper is 2-8 wt % CuO, (v) Ta2O5 is 2-8 wt % and (vi) an oxide selected from the group consisting of $Na_2O$, $K_2O$, $Li_2O$ and combinations thereof is 1-8 wt %, and optionally including any of (vii) $ZrO_2$ 0-6 wt % and (viii) 0-8 wt % $Al_2O_3$, based upon the weight of said first glass frit.

2. A thick-film resistor paste composition according to claim 1 wherein said ruthenium oxide has an average specific surface area of greater than about 15 $m^2/g$.

3. A thick-film resistor paste composition according to claim 1 wherein said ruthenium pyrochlore oxide is lead ruthenium pyrochlore oxide.

4. A thick-film resistor paste composition according to claim 1 wherein said first glass frit comprises from about 8 wt % to about 20 wt % of said thick-film resistor paste composition, based upon the weight of said thick-film resistor paste composition.

5. A thick-film resistor paste composition including a resistor composition dispersed in an organic vehicle, said resistor composition comprising:
    (a) a conductive composition comprising ruthenium oxide and ruthenium pyrochlore oxide; and
    (b) at least a first and a second glass frit, wherein said first glass frit comprises copper,
    wherein said first glass frit comprises: (i) 5-36 wt % $B_2O_3$, (ii) 23-54 wt % $SiO_2$, (iii) an oxide selected from the group consisting of 6-54 wt % BaO, CaO, 2-13 wt % ZnO, 0.5-5.0 wt % SrO, and combinations thereof; and wherein (iv) said copper is 1-9 wt % CuO, (v) $Ta_2O_5$ is 0.3-7 wt % and (vi) an oxide selected from the group consisting of 0.5-6.0 wt % $Na_2O$, 0.3-8.0 wt % $K_2O$, Li$_2$O and combinations thereof, and (vi) 2-7 wt % Al$_2$O$_3$, based upon the weight of said first glass frit.

6. A thick-film resistor paste composition according to claim 5 wherein said ruthenium oxide has an average specific surface area of greater than about 15 m$^2$/g.

7. A thick-film resistor paste composition according to claim 5 wherein said ruthenium pyrochlore oxide is lead ruthenium pyrochlore oxide.

8. A thick-film resistor paste composition according to claim 5 wherein said first glass frit comprises from about 8 wt % to about 20 wt % of said thick-film resistor paste composition, based upon the weight of said thick-film resistor paste composition.

9. A thick-film resistor paste composition including a resistor composition dispersed in an organic vehicle, said resistor composition comprising:
(a) a conductive composition comprising ruthenium oxide and optionally ruthenium pyrochlore oxide; and
(b) at least a first and a second glass frit, wherein said first glass frit comprises copper,
wherein said first glass frit comprises: (i) 5-15 wt % B$_2$O$_3$, (ii) 40-55 wt % SiO$_2$, (iii) 15-35 wt % of an oxide selected from the group consisting of BaO, CaO, ZnO, SrO, and combinations thereof; and wherein (iv) said copper is 2-8 wt % CuO, (v) Ta$_2$O$_5$ is 2-8 wt % and (vi) an oxide selected from the group consisting of Na$_2$O, K$_2$O, Li$_2$O and combinations thereof is 1-8 wt %, optionally including any of (vii) ZrO$_2$ 0-6 wt % and (viii) 0-8 wt % Al$_2$O$_3$, based upon the weight of said first glass frit.

10. A thick-film resistor paste composition according to claim 9 wherein said ruthenium oxide has an average specific surface area of greater than about 15 m$^2$/g.

11. A thick-film resistor paste composition according to claim 9 wherein said first glass frit comprises from about 8 wt % to about 20 wt % of said thick-film resistor paste composition, based upon the weight of said thick-film resistor paste composition.

12. A thick-film resistor paste composition including a resistor composition dispersed in an organic vehicle, said resistor composition comprising:
(a) a conductive composition comprising ruthenium oxide and optionally ruthenium pyrochlore oxide; and
(b) at least a first and a second glass frit, wherein said first glass frit comprises copper,
wherein said first glass frit comprises: (i) 5-36 wt % B$_2$O$_3$, (ii) 23-54 wt % SiO$_2$, (iii) an oxide selected from the group consisting of 6-54 wt % BaO, CaO, 2-13 wt % ZnO, 0.5-5.0 wt % SrO, and combinations thereof; and wherein (iv) said copper is 1-9 wt % CuO, (v) Ta$_2$O$_5$ is 0.3-7 wt % and (vi) an oxide selected from the group consisting of 0.5-6.0 wt % Na$_2$O, 0.3-8.0 wt % K$_2$O, Li$_2$O and combinations thereof, and (vi) 2-7 wt % Al$_2$O$_3$, based upon the weight of said first glass frit.

13. A thick-film resistor paste composition according to claim 12 wherein said ruthenium oxide has an average specific surface area of greater than about 15 m$^2$/g.

14. A thick-film resistor paste composition according to claim 12 wherein said first glass frit comprises from about 8 wt % to about 20 wt % of said thick-film resistor paste composition, based upon the weight of said thick-film resistor paste composition.

* * * * *